United States Patent
Ang

[19]

[11] Patent Number: 5,838,481
[45] Date of Patent: Nov. 17, 1998

[54] ACHROMATIC TELECENTRIC F-THETA SCAN LENS OPTICAL SYSTEM WITH IMPROVED LINEARITY

[75] Inventor: Anthony Ang, Long Beach, Calif.

[73] Assignee: Xerox Corporation, Stamford, Conn.

[21] Appl. No.: 641,769

[22] Filed: May 2, 1996

[51] Int. Cl.⁶ ................................................. G02B 26/08
[52] U.S. Cl. .......................... 359/208; 359/205; 359/206; 359/662
[58] Field of Search ..................................... 359/205, 206, 359/207, 208, 662, 727, 736, 795; 347/244, 258

[56] References Cited

U.S. PATENT DOCUMENTS 4,396,254  8/1983  Shibuya .................................. 350/463
4,863,250  9/1989  Ishizuka ................................. 350/463
5,404,247  4/1995  Cobb et al. ............................ 359/662

FOREIGN PATENT DOCUMENTS 60-17714  1/1985  Japan .................................... 359/208

Primary Examiner—Cassandra C. Spyrou
Assistant Examiner—Darren E. Schuberg
Attorney, Agent, or Firm—William Propp

[57] ABSTRACT

An achromatic, telecentric f-theta scan lens optical system for a raster output scanner has a positive crown glass lens element, a negative flint lens element and a concave mirror. The refractive indices of the positive crown glass lens element and the negative flint lens element are sufficiently different to achieve achromatization of a light beam by the two lens elements. The positive crown glass lens element, the negative flint lens element and the concave mirror form a telecentric optical system.

1 Claim, 3 Drawing Sheets

SCAN LINE LINEARITY

| FIELD | LOCATION | LINEARITY 690 nm | LINEARITY 680 nm | LINEARITY 670 nm | PERCENT 690 nm | PERCENT 680 nm | PERCENT 670 nm |
|---|---|---|---|---|---|---|---|
| 2 | 9.385300 | -0.000037 | -0.000052 | -0.000060 | -0.000391 | -0.000559 | -0.000636 |
| 3 | 18.770600 | -0.000071 | -0.000102 | -0.000116 | -0.000376 | -0.000543 | -0.000619 |
| 4 | 28.155900 | -0.000099 | -0.000145 | -0.000166 | -0.000350 | -0.000516 | -0.000591 |
| 5 | 37.541200 | -0.000118 | -0.000180 | -0.000207 | -0.000314 | -0.000478 | -0.000551 |
| 6 | 46.926500 | -0.000126 | -0.000202 | -0.000234 | -0.000268 | -0.000430 | -0.000499 |
| 7 | 56.311800 | -0.000119 | -0.000208 | -0.000246 | -0.000211 | -0.000370 | -0.000437 |
| 8 | 65.697100 | -0.000095 | -0.000197 | -0.000238 | -0.000144 | -0.000300 | -0.000362 |
| 9 | 75.082400 | -0.000051 | -0.000165 | -0.000208 | -0.000068 | -0.000219 | -0.000278 |
| 10 | 84.467700 | 0.000015 | -0.000110 | -0.000155 | 0.000018 | -0.000130 | -0.000183 |
| 11 | 93.853000 | 0.000103 | -0.000031 | -0.000076 | 0.000109 | -0.000033 | -0.000081 |
| 12 | 103.238300 | 0.000212 | 0.000070 | 0.000027 | 0.000205 | 0.000068 | 0.000026 |
| 13 | 112.623600 | 0.000340 | 0.000192 | 0.000152 | 0.000302 | 0.000170 | 0.000135 |
| 14 | 122.008900 | 0.000480 | 0.000327 | 0.000293 | 0.000393 | 0.000268 | 0.000240 |
| 15 | 131.394200 | 0.000622 | 0.000466 | 0.000439 | 0.000473 | 0.000354 | 0.000334 |
| 16 | 140.779500 | 0.000749 | 0.000592 | 0.000574 | 0.000532 | 0.000421 | 0.000408 |
| 17 | 150.164800 | 0.000839 | 0.000682 | 0.000676 | 0.000558 | 0.000454 | 0.000450 |
| 18 | 159.550100 | 0.000858 | 0.000704 | 0.000712 | 0.000537 | 0.000441 | 0.000446 |
| 19 | 168.935400 | 0.000761 | 0.000612 | 0.000637 | 0.000451 | 0.000363 | 0.000377 |
| 20 | 178.320700 | 0.000490 | 0.000348 | 0.000391 | 0.000275 | 0.000195 | 0.000219 |
| 21 | 187.706000 | 0.000031 | 0.000166 | -0.000102 | -0.000018 | 0.000088 | 0.000054 |
| MAX | | 0.000858 | 0.000704 | 0.000712 | 0.000558 | 0.000454 | 0.000450 |
| MIN | | -0.000126 | -0.000208 | -0.000246 | -0.000391 | -0.000559 | -0.000636 |

FIG. 3

ACHROMATIC TELECENTRIC F-THETA SCAN LENS OPTICAL SYSTEM WITH IMPROVED LINEARITY

BACKGROUND OF THE INVENTION

This invention relates to a f-theta scan lens optical system for a raster output scanner (ROS), and, more particularly, to an achromatic, telecentric f-theta scan lens optical system with improved linearity for a raster output scanner.

Printing systems utilizing lasers to reproduce information are well known in the art. Typically, a laser beam is emitted from a semiconductor laser diode. The light beam is modulated by an acousto-optic modulator or laser diode driver electronics in accordance with input information to be reproduced. The modulated light beam is collimated by a collimating lens. The light beam is then scanned by a multifaceted rotating polygon mirror across a scan line on a medium. Various optical components are used to focus and align the light beam at the medium.

The modulated collimated light beam is reflected off one of the facets of the rotating polygon mirror to sweep across the scan line. The light beam must scan at a constant linear velocity to maintain a uniform exposure of the pixels along the scan line. Since the polygon mirror rotates at a constant speed, the light beam scans at a constant angular velocity. The image height of the lens between the rotating polygon mirror and the scan line should be proportional to the scan angle. The linear velocity of the pixels formed along the scan line is made proportional to the angular velocity of the scanning beam by a f-theta scan lens. In a f-theta scan lens, f denotes the focal length of the lens and theta is the angle of the scanning beam at the lens.

A f-theta scan lens can consist of any number of lenses. A typical f-theta scan lens can have two lens elements consisting of a first negative toroidal lens and a second positive spherical lens. The f-theta scan lens can be followed in the optical path by a curved wobble correction mirror. Virtually all f-theta scan lens optical systems are designed for a light beam of a single wavelength emitted from the light source.

However, the refractive index of all optical lenses varies with wavelength. Chromatic aberration occurs because two light beams of even slightly different wavelengths will be focused by the same lens at different locations. The semiconductor laser diode used as a light source in a ROS is driven by an electric current, which, as a side effect, also heats the semiconductor laser. Variations in temperature within a semiconductor laser cause the emitted light beam to vary in wavelength. The wavelength can vary by ±10 nanometers in what is called in the art "mode hopping". These different wavelength light beams will be refracted differently by the f-theta scan lens to different positions on the scan line.

The pixel placement along the scan line is the linearity of the scanning beam. Since all the pixels from the scanning beam of the ROS should be aligned in a straight line, then pixel mispositioning due to chromatic aberration from wavelength variation should be minimized. In the context of a raster output scanner, chromatic aberration will cause the pixel placement on the scan line not to be straight nor parallel with adjacent scan lines, a problem referred to in the art as "jitter".

An achromatic lens is a compound lens corrected for chromatic aberrations so that the compound lens has the same focal length for two or more wavelengths.

A telecentric optical lens system causes the central ray of a focused beam to emerge perpendicular to the scanning plane upon which is the scan line. A telecentric optical lens system corrects for improper focusing and position errors from the rotating polygon mirror in a ROS to achieve accurate placement of the pixels along the scan line.

Achromatic telecentric f-theta scan lenses have been designed. However, such designs tend to have large numbers of optical elements in intricate mathematical and optical configurations.

One achromatic telecentric f-theta scan lens system found in U.S. Pat. No. 4,863,250 has a negative first lens group of one or two lenses, a positive second lens group of three lenses, a positive third lens group of three lenses and a fourth lens group of two lenses spaced close to the scan plane.

Another achromatic telecentric f-theta scan lens system detailed in U.S. Pat. No. 4,396,254 has a negative first lens group of two lenses, a second bi-convex lens, a third bi-convex lens and a fourth positive lens group of three lenses.

Still another achromatic telecentric f-theta scan lens system in U.S. Pat. No. 5,404,247 has seven lenses arranged as a first concave lens, a second bi-concave lens, a third convex lens, a fourth concave lens, a fifth and sixth bi-convex lenses, and a seventh bi-concave lens.

As noted in U.S. Pat. No. 5,404,247, seven spaced apart lenses in the prior art f-theta scan lenses necessarily limit the scan angle of the beam to a narrow scan angle of ±11.5 degrees on the scan line. The prior art achromatic telecentric f-theta scan lens system can vary the linearity of the relative pixel locations on the scan line by up to 5 microns.

It is an object of this invention to provide an achromatic, telecentric f-theta scan lens optical system with a wide scan angle and improved linearity along the scan line.

It is another object of this invention to provide an achromatic, telecentric f-theta scan lens optical system with a minimum of optical elements.

SUMMARY OF THE INVENTION

In accordance with the present invention, an achromatic, telecentric f-theta scan lens optical system for a raster output scanner has a positive crown glass lens element, a negative flint lens element and a concave mirror. The refractive indices of the positive crown glass lens element and the negative flint lens element are sufficiently different to achieve achromatization of a light beam by the two lens elements. The positive crown glass lens element, the negative flint lens element and the concave mirror form a telecentric optical system.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 is a table of angle, pixel position and linearity of the achromatic, telecentric f-theta scan lens optical system of FIG. 2.

DESCRIPTION OF THE PREFERRED EMBODIMENT

Figure 1:
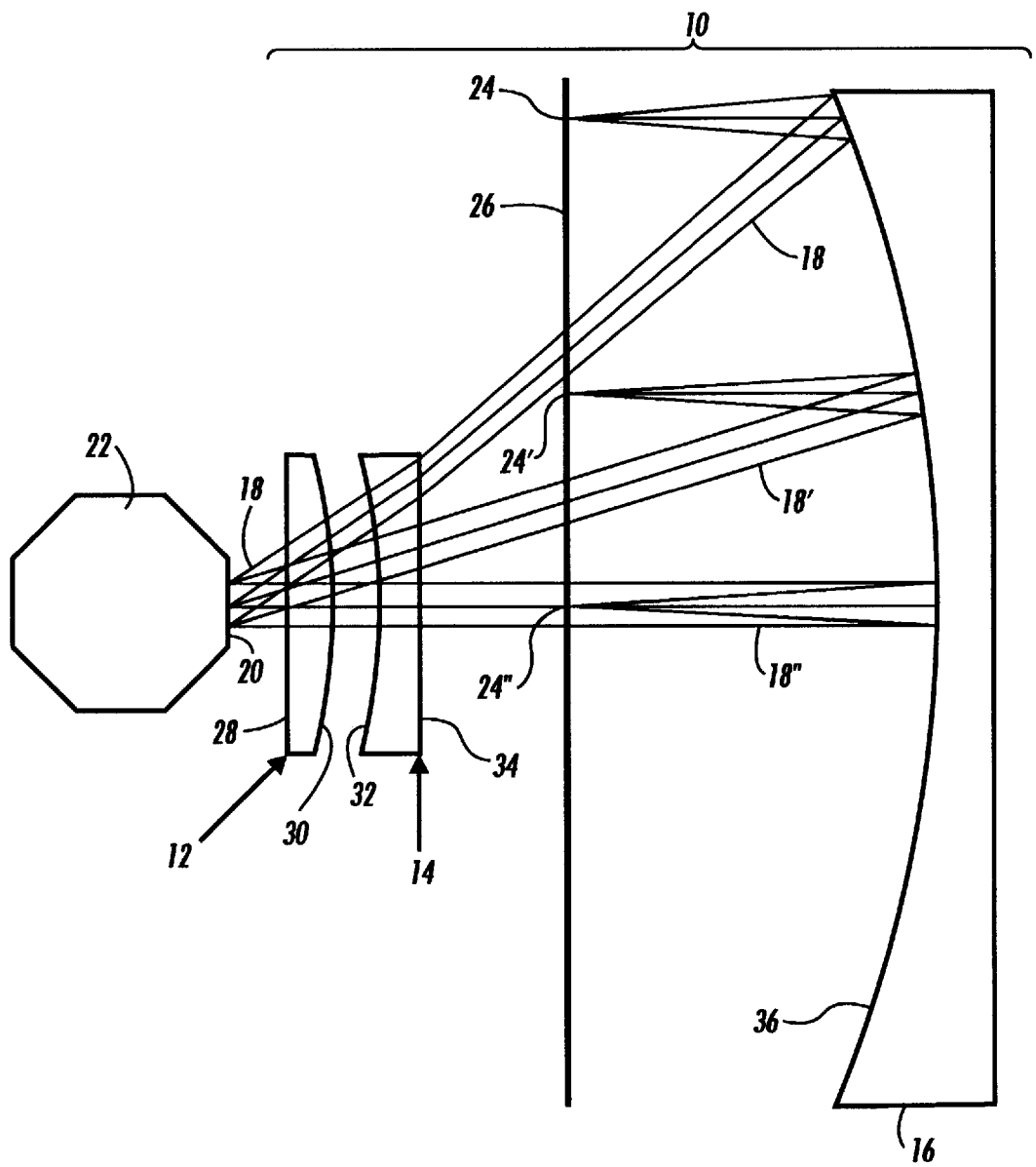
FIG. 1 is a schematic illustration of the cross-section scan plane view of the achromatic, telecentric f-theta scan lens optical system for a raster output scanner formed according to the present invention.

Reference is now made to FIG. 1, wherein there is illustrated the achromatic, telecentric f-theta scan lens optical system 10 for a raster output scanner (ROS) of the present invention. The f-theta scan lens optical system 10 consists of a positive crown glass lens element 12, a negative flint glass lens element 14 and a concave mirror 16.

The scanning function of the f-theta scan lens 10 is primarily provided by the concave mirror 16. The chromatic aberration correction function of the f-theta scan lens 10 is essentially provided by the two positive and negative lens elements 12 and 14. The telecentric function of the f-theta scan lens 10 is essentially provided by all three lens elements, the two positive and negative lens elements 12 and 14 and the concave mirror 16. The linearity function of the f-theta scan lens 10 is essentially provided by the telecentric nature of the scan lens and the primary scanning function of the concave mirror 16.

In elements not shown in FIG. 1, a light beam is emitted by a semiconductor laser diode. The light beam is modulated by an acousto-optic modulator or laser diode driver electronics in accordance with input information to be reproduced. The modulated light beam is collimated by a collimating lens. The collimated, modulated light beam 18 is the reflected at a constant angular velocity from a facet 20 of the rotating polygon mirror 22. The reflected light beam is formed as a pixel 24 on the scan line 26 by the f-theta scan lens optical system 10. The rotation of the polygon mirror 22 will scan the light beam 18 across the scan line 26.

The first positive crown glass lens element 12 of BK7 Schott glass has a plano face 28 on the object side and a convex face 30 on the image side. The second negative flint glass lens element 14 of LAFN7 Schott glass has a concave face 32 on the object side and a piano face 34 on the image side. The mirror 16 has a concave reflecting surface 36 with power in the scan direction.

The facet 20 of the rotating polygon mirror 22 is 71 millimeters from the front face 28 of the first lens element 12. The positive lens element 12 has an infinite radius face 28, a thickness of 12 millimeters and a –160.00000 millimeter radius face 30. The convex back face 30 of the first element 12 is 7.30000 millimeters from the concave front face 32 of the second lens element 14. The negative lens element 14 has a –405.00000 millimeter radius face 32, a thickness of 8.000000 millimeters and an infinite radius face 34. The plano back face 34 of the second lens element 14 is 454.153651 millimeters from the concave surface 36 of the mirror 16. The concave reflecting surface 36 of the mirror 16 has a –1122.00000 millimeter radius and is –161.693496 millimeters from the scan line 26.

The primary scanning function of the f-theta scan lens optical system 10 is provided by the concave mirror 16 which has power in the scan direction. The positive lens element 12 and the negative lens element 14 contribute a non-negligible portion of the scanning function.

The telecentric characteristics of the f-theta scan lens optical system 10 causes the beams 18, 18', and 18" to exit from the image side 34 of the second lens optical element 14 at parallel positions and perpendicular to the scanning plane upon which is the scan line 26. After reflection from the concave mirror 16, the three beams 18, 18', and 18" form pixels 24, 24', and 24" at corresponding positions on the scan line 26.

The achromatic function of the optical system can be provided by just two lenses by shifting the scanning function to the concave mirror. Unlike lenses, the reflectivity of mirrors does not vary with the wavelength of the reflected beam. The chromatic aberration correction for the f-theta scan lens system can be provided by just the two lens.

With a semiconductor laser diode as the light source for the ROS, the wavelength of the emitted light beam can vary by ±10 nanometers by the fluctuation in temperature in the diode. Thus, the achromatic operation of the f-theta scan lens optical system 10 is over a significant wavelength bandwidth.

A ±2 nanometer wavelength fluctuation occurs if the semiconductor laser diode is mounted on a thermoelectric cooler or some other temperature stabilization means. The f-theta scan lens optical system 10 of this embodiment is described in relation to being achromatic over a wavelength range of ±10 nanometers. The f-theta scan lens optical system 10 of this embodiment is also achromatic over the narrower ±2 nanometer wavelength and the much wider wavelength range than ±10 nanometers.

The positive crown glass lens element 12 is BK7 Schott glass with a refractive index of approximately 1.51. The negative flint glass lens element 14 is LAFN7 Schott glass with a refractive index of approximately 1.74. Achromatization is achieved by having two different optical materials with variations in the indices of refraction.

As noted, the refractive index of all optical lenses varies with wavelength. As shown in Table I, the refractive indices of the two lens elements 12 and 14 vary when the wavelength of the light beam is set at 680 nanometers ±10 nanometers and, thus, in the range of 670 to 690 nanometers.

TABLE I

| | WAVELENGTHS | | |
|---|---|---|---|
| REFRACTIVE INDEX | 690.00 nm | 680.00 nm | 670.00 nm |
| BK7 Schott Lens 12 | 1.513335 | 1.513615 | 1.513905 |
| LAFN7 Schott Lens 14 | 1.740768 | 1.741451 | 1.742163 |

Figure 2:
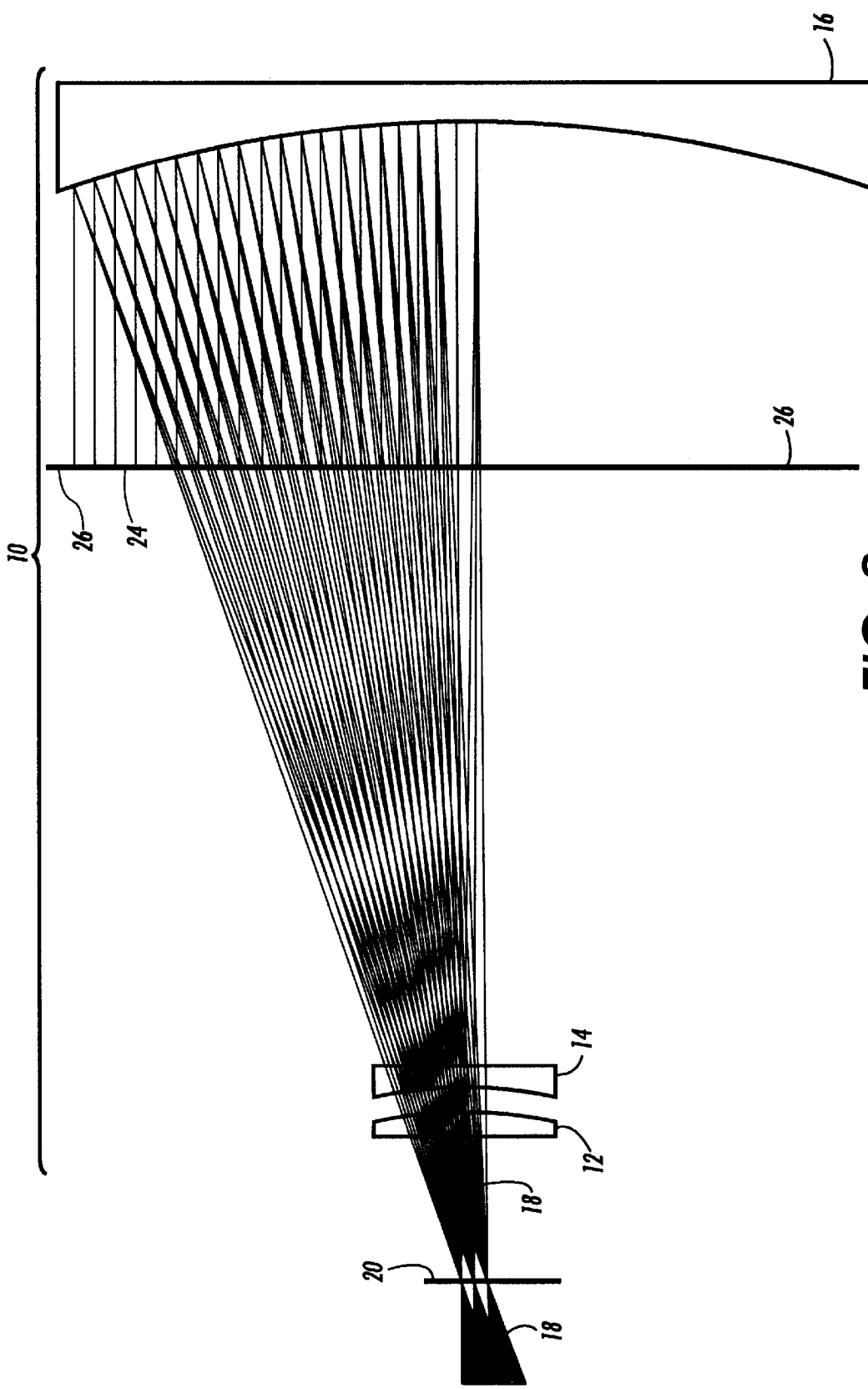
FIG. 2 is a schematic illustration of the cross-section scan plane view of the achromatic, telecentric f-theta scan lens optical system with equal pixel placement location on the scan line for equal angular interval fields of the light beam for a raster output scanner formed according to the present invention.

In this illustrative embodiment of FIGS. 1 and 2, the achromatic, telecentric f-theta scan lens optical system 10 for a raster output scanner (ROS) has an effective focal length of –500.0022 millimeters, a back focal length of –162.0567 millimeters, a forward focal length of –6.9182 millimeters, a f/number of 45.0000, an image distance of –161.6935 millimeters, and an overall length of 552.4537 millimeters. The paraxial image has a height of 197.0521. The scan angle is ±21.5 degrees. The entrance pupil at the incident side 28 of the first lens 12 has a diameter of 11.1112 millimeters and an exit pupil at the scan line 26 after reflection from the reflective surface 36 of the concave mirror 16 has a diameter of 803.0456 millimeters.

As shown in FIG. 2 and detailed in the table of FIG. 3, the achromatic, telecentric f-theta scan lens optical system 10 provides equal pixel placement location on the scan line 26 for equal angular interval fields of the light beam 18 at the light beam wavelengths of 680 nanometers ±10 nanometers (670 and 690 nanometers).

The table of FIG. 3 shows equal field positions of 1.07548 degrees. Field position 1 is 0 degrees, field position 2 is 1.07548 degrees, field position 3 is 2.15095 degrees, field position 4 is 3.22643, field position 5 is 4.30191 degrees, field position 6 is 5.37738 degrees, field position 7 is 6.45286 degrees, field position 8 is 7.52833 degrees, field position 9 is 8.60381 degrees, field position 10 is 9.67929 degrees, field position 11 is 10.75476 degrees, field position 12 is 11.83024 degrees, field position 13 is 12.90571 degrees, field position 14 is 13.98119 degrees, field position 15 is 15.05667 degrees, field position 16 is 16.13214 degrees, field position 17 is 17.20762 degrees, field position 18 is 18.28310 degrees, field position 19 is 19.35857 degrees, field position 20 is 20.43405 degrees, and field position 21 is 21.50952 degrees. This angular spacing covers the 21.5 degrees in 21 field positions.

At a light beam wavelength of 680 nanometers, the linearity of the pixel placement on the scan line ranges from −0.000208 mm to 0.000704 mm deviation which is −0.000559 percent to 0.000454 percent deviation. At a light beam wavelength of 670 nanometers, the linearity of the pixel placement on the scan line ranges from −0.000246 mm to 0.000712 mm deviation which is −0.000636 percent to 0.000450 percent deviation. At a light beam wavelength of 690 nanometers, the linearity of the pixel placement on the scan line ranges from −0.000126 mm to 0.000858 mm deviation which is −0.000391 percent to 0.000558 percent deviation.

The change in position of the pixel on the scan line caused by the variation in wavelength of the light beam is de minimus. The f-theta scan lens optical system 10 uses the concave mirror 16 with power in the scan direction to reduce the linearity to below ±1 millimeter.

Superior linearity of the pixels along the scan line is achieved by having a telecentric scan lens system using a concave mirror. In this design of the achromatic, telecentric f-theta scan lens optical system 10, the linearity for the wavelength range of 670 nanometers to 690 nanometers is within ±0.001 percent with a scan angle theta of ±21.5 degrees and a f/number of 45.

Contrary to prior achromatic, telecentric f-theta scan lenses, the f-theta scan lens optical system 10 has a positive powered lens element first. The achromatic, telecentric f-theta scan lens optical system 10 also only has three optical elements, two lenses and a mirror, as opposed to the seven lenses systems of the prior art. The achromatic, telecentric f-theta scan lens optical system 10 provides superior linearity over a wider scan angle of ±21.5 degrees.

This illustrative embodiment of an achromatic, telecentric f-theta scan lens optical system has been shown for a single beam ROS. The achromatic, telecentric f-theta scan lens optical system will also provide achromaticity, telecentricity and linearity to multiple ROS units.

Multiple ROS units form an image upon image in either a single pass or multiple passes. Pixel placement of the light beam upon the scan line is even more important than in a single ROS since pixels from each of the multiple ROS units must be aligned with previous pixels from other ROS units.

The achromatic, telecentric f-theta scan lens optical system maintains pixel placement over a range of wavelengths emitted by the light source. Thus, this f-theta scan lens provides achromaticity, telecentricity and linearity to multiple wavelength beam ROS units.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A f-theta scan lens optical system for a raster output scanner having a concave mirror, comprising a first positive lens element having a first refractive index, and a second negative lens element having a second refractive index, said second refractive index being sufficiently different from said first refractive index to achieve achromatization of a light beam by said first positive lens element and said second negative lens element, wherein said first positive lens element, said second negative lens element and said concave mirror form a telecentric optical system.

* * * * *